United States Patent
Lee

(10) Patent No.: US 10,154,378 B2
(45) Date of Patent: Dec. 11, 2018

(54) SYSTEM AND METHOD FOR TRACKING LOCATION OF WORKER

(71) Applicant: Electronics and Telecommunications Research Institute, Daejeon (KR)

(72) Inventor: Seung Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 15/359,183

(22) Filed: Nov. 22, 2016

(65) Prior Publication Data

US 2017/0150315 A1    May 25, 2017

(30) Foreign Application Priority Data

Nov. 23, 2015 (KR) .................. 10-2015-0164001
Nov. 21, 2016 (KR) .................. 10-2016-0154973

(51) Int. Cl.
*H04W 4/029* (2018.01)
*H04W 4/02* (2018.01)
*H04W 4/021* (2018.01)

(52) U.S. Cl.
CPC ........... *H04W 4/023* (2013.01); *H04W 4/021* (2013.01); *H04W 4/029* (2018.02)

(58) Field of Classification Search
CPC ... H04L 5/0037; H04L 27/0006; H04B 1/719; H04W 4/023; H04W 4/028; H04W 4/021; H04W 4/029; H04W 64/003; H04W 4/02; H04W 4/04; H04W 4/043; H04W 4/046; H04W 4/024
See application file for complete search history.

(56) References Cited

U.S. PATENT DOCUMENTS

| | | | |
|---|---|---|---|
| 8,724,599 B2 * | 5/2014 | Kim | H04W 48/16 370/338 |
| 2008/0218403 A1 | 9/2008 | Lee et al. | |
| 2009/0147832 A1 | 6/2009 | Kim et al. | |
| 2010/0128617 A1 * | 5/2010 | Aggarwal | H04W 56/009 370/252 |
| 2011/0176523 A1 * | 7/2011 | Huang | G01S 5/02 370/338 |
| 2012/0289243 A1 * | 11/2012 | Tarlow | G01S 5/0072 455/456.1 |
| 2013/0109413 A1 * | 5/2013 | Das | H04W 4/04 455/456.6 |
| 2014/0187257 A1 * | 7/2014 | Emadzadeh | G01S 5/0242 455/456.1 |
| 2015/0094103 A1 * | 4/2015 | Wang | H04W 4/023 455/456.6 |

FOREIGN PATENT DOCUMENTS

KR  10-2012-0040601 A  4/2012
KR  10-2015-0052580 A  5/2015

* cited by examiner

*Primary Examiner* — Julio Perez
(74) *Attorney, Agent, or Firm* — William Park & Associates Ltd.

(57) ABSTRACT

Provided is a system for tracking locations of workers. In the system, a first mobile terminal of a first worker located in a coverage area of an anchor node may perform wireless communication with the anchor node to operate in a tracking mode of tracking a location of the first worker, and a second mobile terminal of a second worker located outside the coverage area of the anchor node may perform wireless communication with the first mobile terminal entering a virtual perimeter to track a location of the second worker.

9 Claims, 4 Drawing Sheets

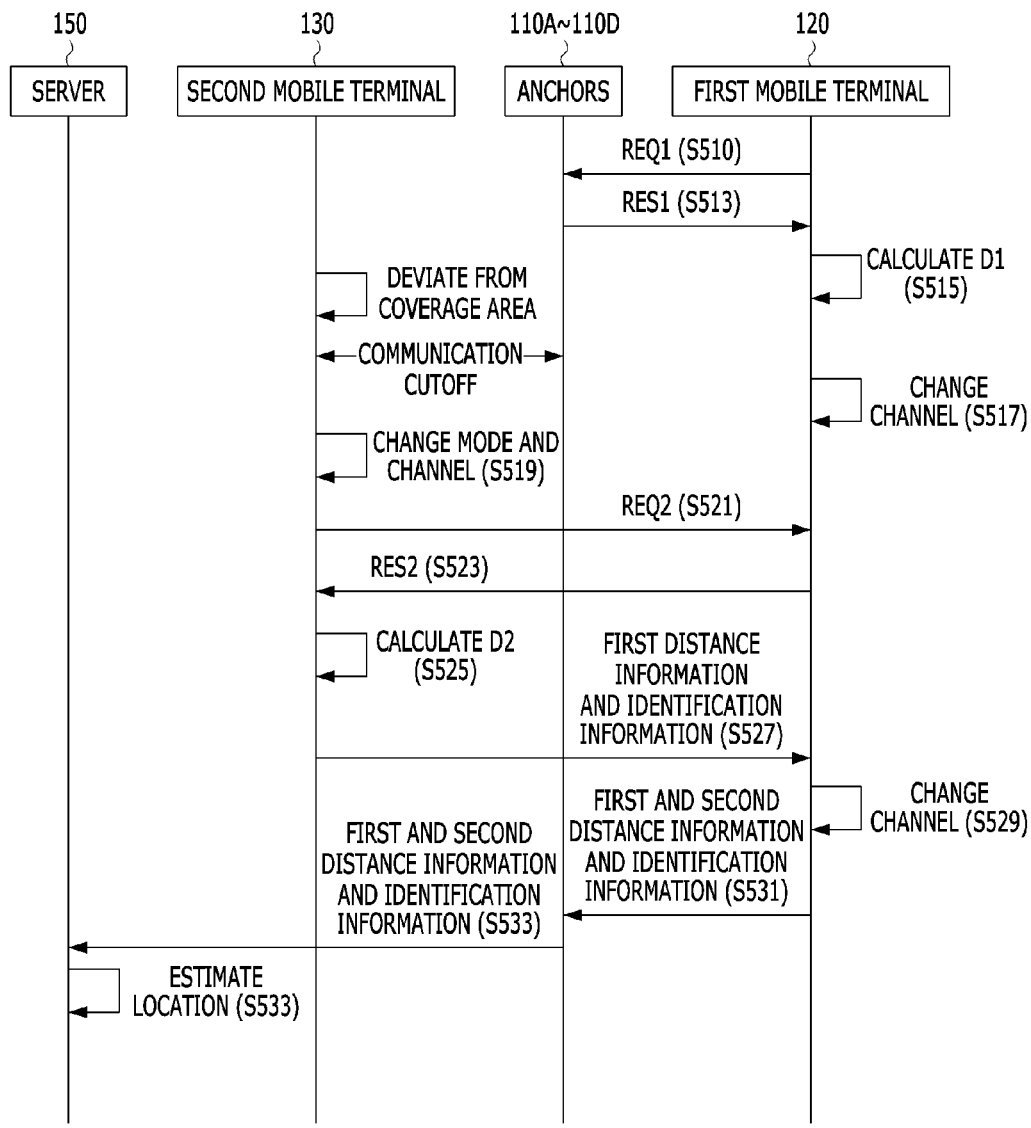

SYSTEM AND METHOD FOR TRACKING LOCATION OF WORKER

CROSS-REFERENCE TO RELATED APPLICATIONS

This application claims priority under 35 U.S.C. § 119 to Korean Patent Application No. 10-2015-0164001, filed on Nov. 23, 2015 and Korean Patent Application No. 10-2016-0154973, filed on Nov. 21, 2016, the disclosure of which is incorporated herein by reference in its entirety.

TECHNICAL FIELD

The present invention relates to a system and method for tracking locations of workers, and more particularly, to a system and method for tracking locations of workers which work at a building workplace of an offshore plant, a large vessel, and/or the like.

BACKGROUND

The jobs of building an offshore plant, a large vessel, and/or the like is classified into industries where accidents of workers frequently occur in the middle of working at a building workplace. Therefore, a building workplace of an offshore plant, a large vessel, and/or the like needs a system which monitors locations of workers to effectively handle risk situations of the workers.

However, since a process of building an offshore plant, a large vessel, and/or the like is performed in a closed indoor workplace, it is difficult to monitor locations of workers by using location tracking technology based on a global positioning system (GPS).

SUMMARY

Accordingly, the present invention provides a system and method for tracking a location of a worker, which efficiently track locations of workers at a building workplace of an offshore plant, a large vessel, and/or the like without using a GPS.

In one general aspect, a method of tracking locations of workers in a vessel includes: performing, by a first mobile terminal of a first worker, wireless communication with N (where N is a natural number equal to or more than four) number of anchors, of which locations are known, through a first wireless communication channel to generate first distance information including N number of distance values between the N anchors and the first mobile terminal; performing, by a second mobile terminal of a second worker outside a coverage area of each of the N anchors, wireless communication with the first mobile terminal through a second wireless communication channel to generate second distance information including a distance value between the first mobile terminal and the second mobile terminal; transmitting, by the first mobile terminal, the first distance information, identification information about each of the N anchors, and the second distance information, received from the second mobile terminal through the second wireless communication channel, to the server through one of the N anchors; and estimating, by the server, a location of the first mobile terminal by using location values of anchors matched with the identification information and the first distance information, and estimating a location of the second mobile terminal by using the estimated location of the first mobile terminal and the second distance information.

In another general aspect, a system for tracking locations of workers includes: a first mobile terminal located in a coverage area of each of N (where N is a natural number equal to or more than four) number of anchors, of which locations are known, and configured to perform wireless communication with the N anchors through a first wireless communication channel to generate first distance information including N number of distance values to the N anchors and transmit the generated first distance information and identification information about each of the N anchors to one of the N anchors; a second mobile terminal located outside the coverage area of each of the N anchors and configured to perform wireless communication with the first mobile terminal through a second wireless communication channel to generate second distance information including a distance value to the first mobile terminal and transmit the generated second distance information to the one anchor through the first mobile terminal; and a server configured to receive the first distance information, the identification information about each of the N anchors, and the second distance information from the one anchor, estimate a location of the first mobile terminal by using location values of anchors matched with the identification information and the first distance information, and estimate a location of the second mobile terminal by using the estimated location of the first mobile terminal and the second distance information.

Other features and aspects will be apparent from the following detailed description, the drawings, and the claims.

BRIEF DESCRIPTION OF THE DRAWINGS

FIG. 6 is a flowchart illustrating flows of signals transmitted or received between mobile terminals, anchors, and servers illustrated in FIG. 1.

DETAILED DESCRIPTION OF EMBODIMENTS

The advantages, features and aspects of the present invention will become apparent from the following description of the embodiments with reference to the accompanying drawings, which is set forth hereinafter.

However, the present invention may be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
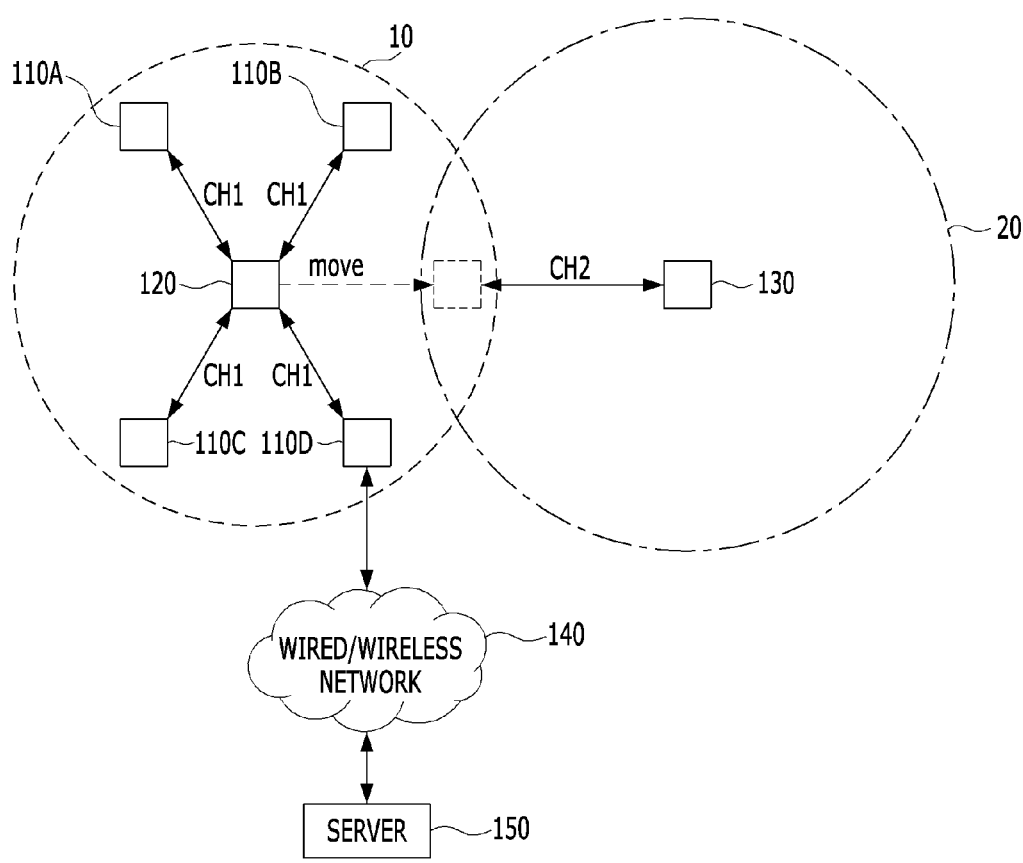
FIG. 1 is a diagram illustrating a whole configuration of a worker location tracking system according to an embodiment of the present invention.

FIG. 1 is a diagram illustrating a whole configuration of a worker location tracking system according to an embodiment of the present invention.

Referring to FIG. 1, the worker location tracking system according to an embodiment of the present invention may include a plurality of anchors (or anchor nodes) 110A to 110D, a first mobile terminal 120, a second mobile terminal 130, a wired/wireless network 140, and a server 150.

A Plurality of Anchors 110A to 110D

The plurality of anchors 110A to 110D may be fixedly installed in an offshore plant, a large vessel, and/or the like, and installation location coordinates may be assigned based on a design drawing of each of the offshore plant and the large vessel. Therefore, an installation location of each of the anchors 110A to 110D may be information capable of being beforehand known.

Each of the anchors 110A to 110D may wirelessly communicate with a first mobile terminal 120, located in a coverage area 10 formed by a corresponding anchor, through a first wireless communication channel CH1 to perform an operation of tracking a location of the first mobile terminal 120. Here, for example, the wireless communication may be ultra-wideband (UWB) communication, chirp spread spectrum ultra-wideband (CSS-UWB) communication, impulse-radio UWB (IR-UWB) communication, or the like. In this case, the first wireless communication channel CH1 may be referred to as a first UWB channel.

In FIG. 1, for conciseness of the drawings, the coverage area 10 is illustrated as one circle. However, the coverage area 10 is not limited thereto and may be an intersection area of coverage areas respectively formed by the anchors 110A to 110D.

Each of the anchors 110A to 110D may be an access point (AP) or a reader.

In FIG. 1, four anchors are exemplarily illustrated, but the number of the anchors is not limited thereto. In other embodiments, the number of the anchors may be five or more.

The four anchors 110A to 110D may perform the same operation. The four anchors 110A to 110D may be connected to each other by wire or wirelessly to share information.

One of the four anchors 110A to 110D may be set as a master anchor, and the other anchors may be set as slave anchors. In FIG. 1, reference numeral "110D" refers to the master anchor, and reference numerals "110A to 110C" refer to the slave anchors.

As described above, the master anchor 110D may perform an operation which is the same as that of each of the slave anchors 110A to 110C, and may further perform an operation of communicating with the server 150 over a wired/wireless network 140.

In detail, the master anchor 110D may transmit a tag signal, received from the first mobile terminal 120 through the first wireless communication channel CH1, to the server 150 over the wired/wireless network 140. On the other hand, the master anchor 110D may transmit information, received from the server 150, to the first mobile terminal 120.

First Mobile Terminal 120 and Second Mobile Terminal 130

The first mobile terminal 120 may be a terminal of a first worker which works in a plant, a vessel, or the like, and the second mobile terminal 130 may be a terminal of a second worker which works in the plant, the vessel, or the like.

Each of the first and second mobile terminals 120 and 130 according to an embodiment of the present invention may be, for example, a terminal into which an UWB chip for performing UWB communication is built. Therefore, each of first and second mobile terminals 120 and 130 may be a digital broadcast terminal, a personal digital assistant (PDA), a smartphone, a tablet personal computer (PC), an Ipad, a 3G terminal, or the like into which the UWB chip is built. Examples of the 3G terminal may include all information communication devices and multimedia devices such as international mobile telecommunication 2000 (IMT-2000) terminals, wideband code division multiple access (WCDMA) terminals, global system for mobile communication packet radio service (GSM/GPRS) terminals, universal mobile telecommunication service (UMTS) terminals, etc.

The first and second mobile terminals 120 and 130 may perform the same operation, but may perform different operations depending on locations. That is, when all of the first and second mobile terminals 120 and 130 are located in the coverage area 10 formed by each of the anchors 110A to 110D, the first and second mobile terminals 120 and 130 may perform the same operation. On the other hand, when one of the first and second mobile terminals 120 and 130 is located in the coverage area 10 and the other terminal is outside the coverage area 10, the first and second mobile terminals 120 and 130 may perform different operations.

In an embodiment, as illustrated in FIG. 1, the first mobile terminal 120 located in the coverage area 10 may operate in a tracking mode where the first mobile terminal 120 functions as a tag which performs wireless communication with the anchors 110A to 110D, and the second mobile terminal 130 outside the coverage area 10 may operate in a Geo-fencing mode of performing wireless communication with the first mobile terminal 120 so as to sense the first mobile terminal 120 entering a virtual perimeter 20.

That is, the second mobile terminal 130 may operate in the tracking mode in the coverage area 10, but may operate in the Geo-fencing mode outside the coverage area 10. This may denote that the second mobile terminal 130 functions as a tag in the coverage area 10, but a function of the second mobile terminal 130 is changed to a function of an anchor (or an AP), which senses the first mobile terminal 120 functioning as a tag, outside the coverage area 10.

In detail, the first mobile terminal 120 may operate in the tracking mode of performing wireless communication with the anchors 110A to 110D of which locations are known, based on the first wireless communication channel CH1. In the tracking mode, the first mobile terminal 120 may generate first distance information including four distance values between the anchors 110A to 110D and the first mobile terminal 120.

For example, in order to calculate the four distance values, the first mobile terminal 120 may transmit a first request signal for distance measurement to the anchors 110A to 110D, measure a reception time when a first response signal corresponding to the first request signal is received from the anchors 110A to 110D, and calculate the four distance values from the measured reception time, based on a two-way-ranging (TWR) technique.

As another example, the first mobile terminal 120 may calculate each distance value by using a received signal strength indication (RSSI) of the first response signal.

Moreover, the first mobile terminal 120 may periodically change a communication channel from the first wireless communication channel CH1 to a second wireless communication channel CH2 having a frequency different from that of the first wireless communication channel CH1, based on a channel change period which is previously set. The channel change period may include a first time section, where the first wireless communication channel CH1 is activated, and a second time section where the second wireless communication channel CH2 is activated. The first time section and the second time section may be successive or non-successive in time. A length of each of the first and second time sections may be variously set by a designer. For example, lengths of the first and second time sections may differ or may be the same. Here, the second wireless communication channel CH2 may be referred to as a second UWB channel.

The first mobile terminal 120 may periodically attempt to communication-access the second mobile terminal 130 outside the coverage area 10 through the second wireless communication channel CH2. In a state where the second wireless communication channel CH2 is activated, wireless communication between the first mobile terminal 120 and the four anchors 110A to 110D may be stopped.

In FIG. 1, one mobile terminal 120 located in the coverage area 10 is illustrated, but this is for conciseness of the drawings. In other embodiments, one or more other terminals may be further located in the coverage area 10, and operations of the one or more other mobile terminals may calculate distance values to the anchors 110A to 110D in a method which is the same as a method based on an operation performed by the first mobile terminal 120.

The first mobile terminal 120 may transmit first distance information, identification information received from each of the anchors 110A to 110D, second distance information including a distance value between the first and second mobile terminals 120 and 130 calculated by the second mobile terminal 130, and identification information about the second mobile terminal 130 to the master anchor 110D.

The second mobile terminal 130 outside the coverage area 10 may change an operation mode from the tracking mode to the Geo-fencing mode from a time when the second mobile terminal 130 deviates from the coverage area 10. For example, when a signal is not received from each of the anchors during the first time section included in the channel change period or an RSSI of the received signal is equal to or less than a threshold value, the second mobile terminal 120 may recognize that the second mobile terminal 130 is outside the coverage area 10, and may change the operation mode from the tracking mode to the Geo-fencing mode.

As the operation mode is changed to Geo-fencing mode, a function of the second mobile terminal 130 may be changed from a function of a tag to a function of an anchor (or an AP).

As the operation mode is changed to Geo-fencing mode, the second mobile terminal 130 may change the communication channel from the first wireless communication channel CH1 to the second wireless communication channel CH2.

As the operation mode is changed to Geo-fencing mode, the second mobile terminal 130 may perform channel scan on the second wireless communication channel CH2 to sense the first mobile terminal 120 entering the virtual perimeter 20 and may perform wireless communication with the sensed first mobile terminal 120 through the second wireless communication channel CH2 to generate the second distance information including a distance value between the first mobile terminal 120 and the second mobile terminal 130.

For example, in order to calculate a distance value between the first mobile terminal 120 and the second mobile terminal 130, the second mobile terminal 130 may transmit a second request signal for distance measurement to the first mobile terminal 120, measure a reception time when a second response signal corresponding to the second request signal is received from the first mobile terminal 120, and calculate the distance value from the measured reception time, based on the TWR technique.

As another example, the second mobile terminal 130 may calculate the distance value by using an RSSI of the second response signal.

Moreover, the first mobile terminal 120 may transmit the second distance information received from the second mobile terminal 130, identification information about the second mobile terminal 130, the first distance information generated by the first mobile terminal 120, and identification information about each of the anchors to the master anchor 110D through the first wireless communication channel CH1.

The master anchor 110D, as described above, may process the information (the first distance information, the second distance information, identification information about the first and second mobile terminals 120 and 130, and the identification information about each anchor) in order to transmit the information to the server 150 over the wired/wireless network 140. For example, the master anchor 110D may process the information according to a protocol supported by the below-described wired/wireless network 140.

Wired/Wireless Network 140

The wired/wireless network 140 may establish a communication connection between the master anchor 110D and the server 150 and may include at least one of a computer network, Internet, Internet of things, and a telephone network.

Server 150

The server 150 may estimate locations of first and second workers by using the information (the first distance information, the second distance information, the identification information about the first and second mobile terminals 120 and 130, and the identification information about each anchor) received from the master anchor 110D and may monitor the locations of the first and second workers, based on the estimated locations. Also, the server 150 may transmit various rescue messages to workers.

Figure 2:
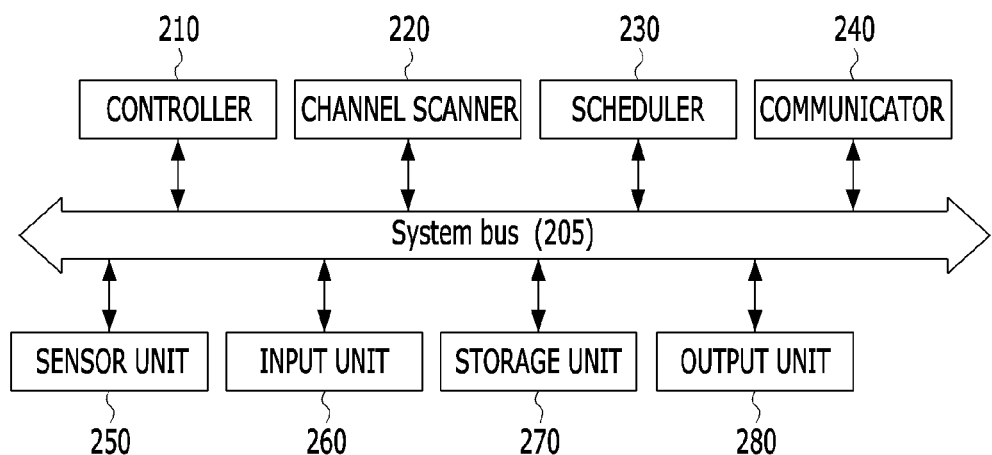
FIG. 2 is a block diagram illustrating functional blocks of a mobile terminal illustrated in FIG. 1.

FIG. 2 is a block diagram illustrating functional blocks of a mobile terminal illustrated in FIG. 1.

Referring to FIG. 2, each of the first and second mobile terminals 120 and 130 may include a controller 210, a channel scanner 220, a scheduler 230, a communicator 240, a sensor unit 250, an input unit 260, a storage unit 270, and an output unit 280. The elements may communicate with each other through a system bus 205.

The controller 210 may be an element for controlling and managing operations of the elements 220 to 280 and may be implemented with one or more processors. Each of the one or more processors may be a central processing unit (CPU) or a semiconductor device, which executes a processing command stored in the storage unit 270.

Moreover, the controller 210 may control an operation of the communicator 240 to use the first wireless communication channel CH1 in the coverage area 10 and change the first wireless communication channel CH1 to the second wireless communication channel CH2 outside the coverage area 10.

Moreover, the controller 210 may control an operation of the scheduler 230 to adjust the first time section where the first wireless communication channel CH1 is activated and the second time section where the second wireless communication channel CH2 is activated, based on the channel change period stored in the storage unit 270.

Moreover, the controller 210 may measure a reception time when the communicator 240 receives the first response signal from the anchors 110A to 110D, and may generate the first distance information including distance values from the first mobile terminal 120 including the controller 210 to the anchors 110A to 110D, based on the measured reception time.

Moreover, the controller 210 may measure a reception time when the communicator 240 receives the second response signal from a mobile terminal located in the coverage area 10, and may generate the second distance information including a distance value from the second mobile terminal 130 including the controller 210 to the mobile terminal located in the coverage area 10.

The channel scanner 220 may alternately perform channel scan on the first wireless communication channel CH1 and the second wireless communication channel CH2 according to control by the controller 210 to sense anchors located in the coverage area 10 and a mobile terminal located outside the coverage area 10.

The scheduler 230 may control the channel scanner 220 to perform the channel scan on the first wireless communication channel CH1 or the second wireless communication channel CH2 according to the channel change period.

Depending on the case, the channel scanner 220 and the scheduler 230 may be included in the controller 210.

The communicator 240 may include at least one of a wireless Internet module and a short-range communication module. The wireless Internet module may transmit or receive a radio frequency (RF) signal over a communication network based on wireless Internet technology. Examples of the wireless Internet technology may include wireless local area network (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), etc. The short-range communication module may be a module that supports short-range communication, and may support the short-range communication by using at least one of Bluetooth™, radio frequency identification (RFID), infrared data association (IrDA), ultra-wideband (UWB), ZigBee, near field communication (NFC), Wi-Fi, Wi-Fi direct, wireless universal serial bus (USB) technologies.

The sensor unit 250 may include a vibration sensor, an emission sensor, a warn sensor, and a heartbeat sensor. The vibration sensor may measure a heart rate of a worker, and when the measured heart rate is equal to or less than a threshold value, the vibration sensor may generate vibration. When the heart rate of the worker is equal to or less than the threshold value, the emission sensor may output an emission signal having various colors in order for the worker to request a rescue from a periphery. When the heart rate of the worker is equal to or less than the threshold value, the alarm sensor may output various audio signals in order for the worker to request a rescue from the periphery.

The input unit 260 may transfer a command or data, input from a user, to the controller 210, the channel scanner 220, the scheduler 230, the communicator 240, the sensor unit 250, the storage unit 270, and the output unit 280 through a system bus 205.

The storage unit 240 may be implemented with a non-volatile memory and/or a volatile memory. The storage unit 240 may store identification information about the anchor received from the anchor, distance information and identification information received from a mobile terminal located outside the coverage area, information associated with the channel change period set by the user, etc.

The output unit 280 may be an element that outputs a video and an audio, and may include an image output means outputting a video and an audio output means outputting an audio.

Figure 3:
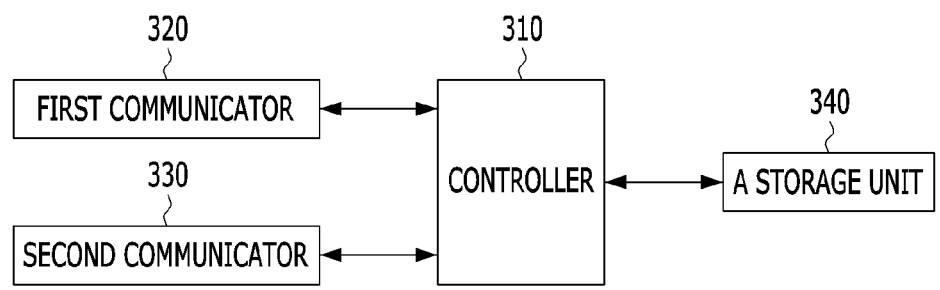
FIG. 3 is a block diagram illustrating functional blocks of an anchor illustrated in FIG. 1.

FIG. 3 is a block diagram illustrating functional blocks of an anchor illustrated in FIG. 1.

Referring to FIG. 3, each of the anchors 110A to 110D may include a controller 310, a first communicator 320, a second communicator 330, and a storage unit 340.

The controller 310 may control and manage an overall operation of an anchor including the controller 310. The controller 310 may control and manage an operation of the first communicator 320 to perform wireless communication with a mobile terminal located in the coverage area 10.

Moreover, the controller 310 may control and manage an operation of the second communicator 330 to transmit information (distance information and identification information), received through the first communicator 320 from a mobile terminal located in the coverage area 10, to the server 150 over the wired/wireless network 140. On the other hand, the controller 310 may control and manage an operation of the second communicator 330 to receive information from the server 150.

The first communicator 320 may be a module that supports short-range communication, and may support the short-range communication by using at least one of Bluetooth™, radio frequency identification (RFID), infrared data association (IrDA), ultra-wideband (UWB), ZigBee, near field communication (NFC), Wi-Fi, Wi-Fi direct, wireless universal serial bus (USB) technologies.

The second communicator 330 may support various communication schemes to enable an access to the wired/wireless network 140. For example, the second communicator 330 may be connected to a network 162 through wireless communication or wired communication to communicate with the server 150. The wireless communication may include, for example, at least one of Wi-Fi, Bluetooth, Zigbee, NFC, GPS, and cellular communication (for example, LTE, LTE-A, CDMA, WCDMA, UMTS, WiBro, GSM, etc.). The wired communication may include, for example, at least one of universal serial bus (USB), high definition multimedia interface (HDMI), recommended standard 232 (RS-232), and plain old telephone service (POTS).

The storage unit 340 may be implemented with a non-volatile memory and/or a volatile memory. The storage unit 340 may store hardware information such as information received from the mobile terminal and identification information about the anchor including the storage unit 340.

Figure 4:
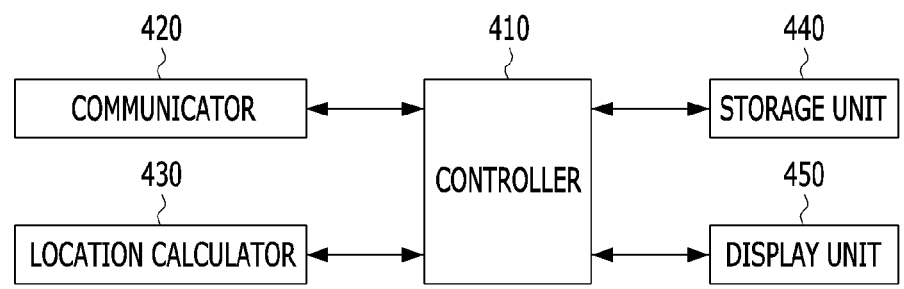
FIG. 4 is a block diagram illustrating functional blocks of a server illustrated in FIG. 1.
Figure 5:
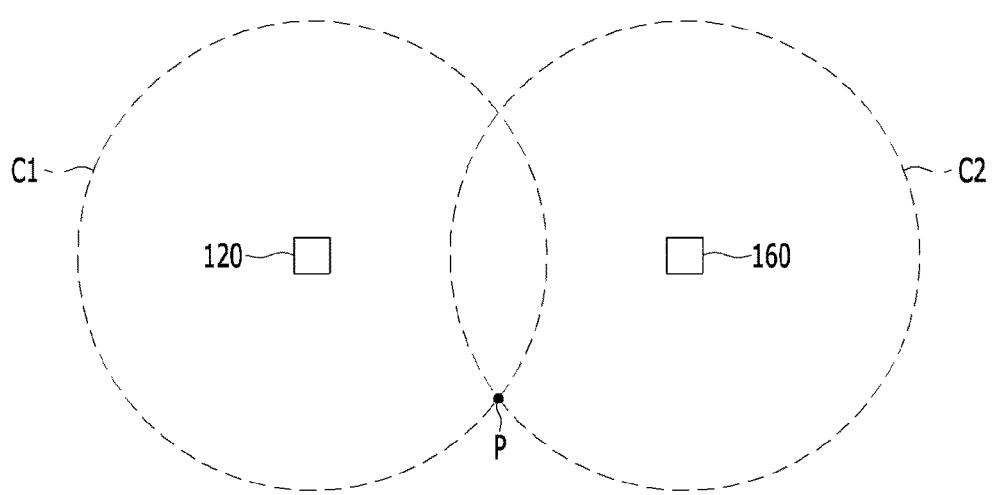
FIG. 5 is a diagram schematically illustrating a process of calculating, by a location calculator illustrated in FIG. 4, a location of a second mobile terminal.

FIG. 4 is a block diagram illustrating functional blocks of the server 150 illustrated in FIG. 1.

Referring to FIG. 4, the server 150 may include a controller 410, a communicator 420, a location calculator 430, a storage unit 440, and a display unit 450.

The controller 410 may be an element that controls and manages an overall operation of the server 150. The controller 410 may match a location (locations of first and second mobile terminals) of a worker, calculated by the location calculator 430, with a map and may control the display unit 450 to output a result of the match.

The location calculator 430 may calculate a location of the first mobile terminal 120 located in the coverage area 10 and a location of the second mobile terminal 130 located outside the coverage area 10, based on information received from the master anchor 110D.

In regard to the first mobile terminal 120 located in the coverage area 10, the location calculator 430 may calculate the location of the first mobile terminal 120 by using first distance information including four distance values received from the master anchor and a location of an anchor located in a vessel, based on a time difference of arrival (TDOA) technique.

In regard to the second mobile terminal 130 located outside the coverage area 10, the location calculator 430 may generate a circle having a radius, corresponding to a distance value between the first and second mobile terminals 120 and 130, with respect to the location of the first mobile terminal 120 calculated based on the TDOA technique and may calculate a location of the second mobile terminal 130 located in the circle. In this case, when another mobile terminal (hereinafter referred to as a third mobile terminal) in addition to the first mobile terminal 120 is located in the coverage area 10, the location of the second mobile terminal 130 is more accurately calculated. For example, in a case of calculating a location of the third mobile terminal 160 based on the TDOA technique, as illustrated in FIG. 4, the location calculator 430 may generate a first circle C1 having a radius, corresponding to the distance value between the first and second mobile terminals 120 and 130, with respect to the location of the first mobile terminal 120 and a second circle C2 having a radius, corresponding to a distance value between the second and third mobile terminals 130 and 160, with respect to the location of the third mobile terminal 160 and may calculate coordinates of an intersection point P of the first and second circles C1 and C2 as the location of the second mobile terminal 130.

When the location calculator 430 has calculated the locations of the first and second mobile terminals 120 and 130, the location calculator 430 may transfer a result of the calculation to the controller 410. The controller 410 may match the transferred locations with a map (a vessel map or a plant map) and may supply a result of the match to the display unit 450 in order for the match result to be displayed.

The storage unit 440 may store hardware information (MAC information) such as identification information about each of the first and second mobile terminals 120 and 130, worker information about each of first and second workers, a location value mapped to identification information about an anchor with respect to a design drawing of each of the plant and the vessel, etc.

The display unit 450 may display in real time a location of the first worker of the first mobile terminal 120 and a location of the second worker of the second mobile terminal 130 on a map screen on which the locations of the first and second mobile terminals 120 and 130 are displayed. A manager may check an output screen displayed by the display unit 450 to monitor the locations of the first and second workers in real time.

FIG. 6 is a flowchart illustrating flows of signals transmitted or received between the mobile terminals, the anchors, and the servers illustrated in FIG. 1. Hereinafter, details repetitive of the above-described details will be briefly described, or are omitted.

Referring to FIG. 6, first, the first mobile terminal 120 located in the coverage area 10 may periodically perform channel scan on the first wireless communication channel CH1 and the second wireless communication channel CH2.

In step S510, when the first mobile terminal 120 senses a signal from each of the anchors 110A to 110D in a process of performing the channel scan on the first wireless communication channel CH1, the first mobile terminal 120 may transmit a first request signal REQ1 to each of the anchors for measuring a distance from the first mobile terminal 120 to each anchor.

Subsequently, in step S513, the first mobile terminal 120 may receive a first response signal RES1 corresponding to the first request signal REQ1 from each anchor. In this case, the first response signal RES1 may include identification information about each anchor.

Subsequently, in step S515, the first mobile terminal 120 may calculate four distance values D1 to each anchor by using a time when the first response signal RES1 is received from each anchor and an RSSI of the received first response signal RES1, and may generate first distance information including the calculated four distance values D1.

Steps S510 to S515 may be performed during a first time section where the first wireless communication channel CH1 is activated, based on a channel change period.

Subsequently, in step S517, based on the channel change period, if a time when the second wireless communication channel CH2 is activated arrives, the first mobile terminal 120 may change (or convert) a communication channel from the first wireless communication channel CH1 to the second wireless communication channel CH2.

When the second mobile terminal 130 deviates from the coverage area 10, wireless communication between the second mobile terminal 130 and the anchors 110A to 110D may be cut off. Therefore, in step S519, the second mobile terminal 130 may change the communication channel from the first wireless communication channel CH1 to the second wireless communication channel CH2 from a time when the second mobile terminal 130 deviates from the coverage area 10. Simultaneously, the second mobile terminal 130 may change (or convert) an operation mode from the tracking mode, which tracks the location of the second worker by performing wireless communication with the anchors 110A to 110D, to the Geo-fencing mode of tracking the location of the first worker by performing wireless communication with the first mobile terminal 120 so as to sense the first mobile terminal entering the virtual perimeter.

Subsequently, in step S521, when the second mobile terminal 130 senses the first mobile terminal entering the virtual perimeter, the second mobile terminal 130 may transmit a second request signal REQ2 to the first mobile terminal 120 for measuring a distance from the second mobile terminal 130 to the first mobile terminal 120.

Subsequently, in step S523, the second mobile terminal 130 may receive a second response signal RES2 corresponding to the second request signal REQ2 from the first mobile terminal 120.

Subsequently, in step S525, the second mobile terminal 130 may calculate a distance value from the second mobile terminal 130 to the first mobile terminal 120 by using a time when the second response signal RES2 is received from the first mobile terminal 120 and an RSSI of the received second response signal RES2.

Subsequently, in step S527, the second mobile terminal 130 may transmit second distance information including a distance value from the second mobile terminal 130 to the first mobile terminal 120 and identification information about the second mobile terminal 130 to the first mobile terminal 120 through the second wireless communication channel CH2.

Subsequently, in step S529, based on the channel change period, if a time when the first wireless communication channel CH1 is activated arrives, the first mobile terminal 120 may change the communication channel from the second wireless communication channel CH2, which has been changed in step S517, to the first wireless communication channel CH1.

Subsequently, in step S531, the first mobile terminal 120 may transmit the second distance information received from the second mobile terminal 130, identification information about the second mobile terminal 130 received from the second mobile terminal 130, the first distance information, and identification information about each of the anchors to the master anchor 110D through the first wireless communication channel CH1.

Subsequently, in step S533, the master anchor 110D may transmit information, received from the first mobile terminal 120, to the server 150 over the wired/wireless network 140.

Subsequently, in step S535, the server 150 may search for location values of the anchors stored in the storage 440 (see FIG. 4) to obtain location values of anchors matched with identification information about each of the anchors received from the master anchor 110D and may estimate a location of the first mobile terminal 120 by using the obtained location values of the anchors and the first distance information (a distance between each anchor and the first mobile terminal) received from the master anchor 110D. Also, the server 150 may estimate a location of the second mobile terminal 130 by using the estimated location of the first mobile terminal 120 and the second distance information (a distance between the first mobile terminal and the second mobile terminal).

In addition, the server 150 may further receive state information about first and second workers from the first and second mobile terminals 120 and 130 through the master anchor 110D. Here, the state information may be information associated with a heart rate measured by the heartbeat sensor of each of the mobile terminals.

The server 150 may transmit a rescue request signal to the first and second mobile terminals 120 and 130, based on the state information received from each terminal. For example, when a heart rate included in the state information received from the first mobile terminal 120 is equal to or less than a threshold value, the server 150 may recognize that the first worker of the first mobile terminal 120 is in a risk state, and may transmit the rescue request signal, which requests a rescue of the first worker, to the second mobile terminal 130 through a communication path including the wired/wireless network 140, the master anchor 110D, and the first mobile terminal 120. Also, the rescue request signal may be transmitted to another mobile terminal (not shown) through the communication path. Here, examples of the other mobile terminal may include mobile terminals located in the coverage area and mobile terminals located outside the coverage area.

On the other hand, when a heart rate included in the state information received from the second mobile terminal 130 through the communication path including the first mobile terminal 120, the master anchor 110D, and the wired/wireless network 140 is equal to or less than the threshold value, the server 150 may recognize that the second worker of the second mobile terminal 130 is in a risk state, and may transmit the rescue request signal, which requests a rescue of the second worker, to the first mobile terminal 120 or another mobile terminal (not shown) through a communication path including the wired/wireless network 140 and the master anchor 110D.

As described above, according to the embodiments of the present invention, locations of workers are efficiently tracked at a building workplace of an offshore plant, a large vessel, and/or the like without using a GPS.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of tracking locations of workers in a vessel, the method comprising:
    performing, by a first mobile terminal of a first worker, wireless communication with N (where N is a natural number equal to or more than four) number of anchors, of which locations are known, through a first wireless communication channel to generate first distance information including N number of distance values between the N anchors and the first mobile terminal;
    performing, by a second mobile terminal of a second worker outside a coverage area of each of the N anchors, wireless communication with the first mobile terminal through a second wireless communication channel to generate second distance information including a distance value between the first mobile terminal and the second mobile terminal;
    transmitting, by the first mobile terminal, the first distance information, identification information about each of the N anchors, and the second distance information, received from the second mobile terminal through the second wireless communication channel, to a server through one of the N anchors; and
    estimating, by the server, a location of the first mobile terminal by using location values of anchors matched with the identification information and the first distance information, and estimating a location of the second mobile terminal by using the estimated location of the first mobile terminal and the second distance information,
    wherein when the second mobile terminal deviates from the coverage area of each of the N anchors, the second mobile terminal changes a communication channel from the first wireless communication channel to the second wireless communication channel.

2. The method of claim 1, wherein the generating of the first distance information comprises:
    changing, by the first mobile terminal, a communication channel from the second wireless communication channel to the first wireless communication channel according to a channel change period which is previously set;
    receiving, by the first mobile terminal, a response signal for distance measurement from each of the N anchors through the first wireless communication channel; and
    calculating, by the first mobile terminal, the N distance values between the N anchors and the first mobile terminal by using the received response signal for distance measurement.

3. The method of claim 1, wherein the generating of the second distance information comprises:
 changing, by the second mobile terminal, a communication channel from the first wireless communication channel to the second wireless communication channel when the second mobile terminal deviates from the coverage area;
 receiving, by the second mobile terminal, a response signal for distance measurement from the first mobile terminal through the second wireless communication channel; and
 calculating, by the second mobile terminal, the distance value between the first mobile terminal and the second mobile terminal by using the received response signal for distance measurement.

4. The method of claim 1, wherein the generating of the second distance information comprises:
 changing, by the second mobile terminal, a communication channel from the first wireless communication channel to the second wireless communication channel when the second mobile terminal deviates from the coverage area;
 changing, by the second mobile, a tracking mode of performing wireless communication with the N anchors to a Geo-fencing mode of performing wireless communication with the first mobile terminal to sense the first mobile terminal entering a virtual perimeter;
 receiving, by the second mobile terminal, a response signal for distance measurement through the second wireless communication channel from the first mobile terminal sensed in the Geo-fencing mode; and
 calculating, by the second mobile terminal, the distance value between the first mobile terminal and the second mobile terminal by using the received response signal for distance measurement.

5. The method of claim 1, wherein the transmitting comprises:
 changing, by the first mobile terminal, a communication channel from the second wireless communication channel to the first wireless communication channel;
 transmitting, by the first mobile terminal, the first distance information, the identification information about each of the N anchors, and the second distance information to one of the N anchors through the first wireless communication channel; and
 transmitting, by the one anchor, the first distance information, the identification information about each of the N anchors, and the second distance information to the server through a wired/wireless network.

6. A system for tracking locations of workers, the system comprising:
 a first mobile terminal located in a coverage area of each of N (where N is a natural number equal to or more than four) number of anchors, of which locations are known, and configured to perform wireless communication with the N anchors through a first wireless communication channel to generate first distance information including N number of distance values to the N anchors and transmit the generated first distance information and identification information about each of the N anchors to one of the N anchors;
 a second mobile terminal located outside the coverage area of each of the N anchors and configured to perform wireless communication with the first mobile terminal through a second wireless communication channel to generate second distance information including a distance value to the first mobile terminal and transmit the generated second distance information to the one anchor through the first mobile terminal; and
 a server configured to receive the first distance information, the identification information about each of the N anchors, and the second distance information from the one anchor, estimate a location of the first mobile terminal by using location values of anchors matched with the identification information and the first distance information, and estimate a location of the second mobile terminal by using the estimated location of the first mobile terminal and the second distance information,
 wherein when the second mobile terminal deviates from the coverage area of each of the N anchors, the second mobile terminal changes a communication channel from the first wireless communication channel to the second wireless communication channel.

7. The system of claim 6, wherein when the first mobile terminal is located in the coverage area of each of the N anchors, the first mobile terminal periodically changes a communication channel from the first wireless communication channel to the second wireless communication channel according to a channel change period which is previously set.

8. The system of claim 6, wherein when the second mobile terminal deviates from the coverage area of each of the N anchors, the second mobile terminal performs a function of each of the N anchors performing wireless communication with the first mobile terminal.

9. The system of claim 6, wherein when the second mobile terminal deviates from the coverage area of each of the N anchors, an operation mode of the second mobile terminal is changed from a tracking mode of performing wireless communication with the N anchors to a Geo-fencing mode of performing wireless communication with the first mobile terminal to sense the first mobile terminal entering a virtual perimeter.

* * * * *